(12) United States Patent
Duan et al.

(10) Patent No.: US 8,393,543 B2
(45) Date of Patent: Mar. 12, 2013

(54) METHOD AND APPARATUS FOR SCANNING OPTICAL CODE

(75) Inventors: Zhihui Duan, Warabi (JP); Masayoshi Yamanouchi, Warabi (JP); Kazunori Noborio, Warabi (JP); Yo Tanaka, Warabi (JP); Hiroshi Hayakawa, Warabi (JP)

(73) Assignees: Optoelectronics Co., Ltd. (JP); Opticon, Inc., Renton, WA (US)

( * ) Notice: Subject to any disclaimer, the term of this patent is extended or adjusted under 35 U.S.C. 154(b) by 0 days.

(21) Appl. No.: 12/998,871

(22) PCT Filed: Dec. 10, 2008

(86) PCT No.: PCT/US2008/086160
§ 371 (c)(1),
(2), (4) Date: Oct. 14, 2011

(87) PCT Pub. No.: WO2010/068199
PCT Pub. Date: Jun. 17, 2010

(65) Prior Publication Data
US 2012/0091207 A1    Apr. 19, 2012

(51) Int. Cl.
*G06K 7/10*    (2006.01)
(52) U.S. Cl. ............... 235/470; 235/462.35; 235/462.42
(58) Field of Classification Search ............... 235/470, 235/454, 462.01, 462.41, 462.42, 462.06, 235/462.35; 359/211, 386, 366
See application file for complete search history.

(56) References Cited

U.S. PATENT DOCUMENTS

| | | | | |
|---|---|---|---|---|
| 5,418,356 | A * | 5/1995 | Takano | 235/462.32 |
| 5,955,720 | A | 9/1999 | He et al. | |
| 6,073,851 | A * | 6/2000 | Olmstead et al. | 235/462.45 |
| 7,224,540 | B2 | 5/2007 | Olmstead et al. | |
| 7,428,093 | B2 * | 9/2008 | Tegreene et al. | 359/290 |
| 2003/0001071 | A1 * | 1/2003 | Mandella et al. | 250/201.3 |
| 2007/0279721 | A1 * | 12/2007 | Shechlerman | 359/211 |

OTHER PUBLICATIONS

International Search Report and Written Opinion, dated Feb. 4, 2009 of International Application No. PCT/US08/086160, filed: Dec. 10, 2008.
International Preliminary Report on Patentability, dated Jun. 23, 2011 of International Application No. PCT/US08/086160, filed: Dec. 10, 2008.

* cited by examiner

*Primary Examiner* — Edwyn Labaze
(74) *Attorney, Agent, or Firm* — Kaplan Breyer Schwarz & Ottesen, LLP

(57) ABSTRACT

An optical aberration is intentionally introduced into the optical system which produces the scanning beam of an optical code scanner, in order to produce a scanning beam which has plural focal points or waists at different distances from the scanner. The operating range of the scanner can thereby be increased by taking advantage of different beam waist locations when the optical code is at different distances from the scanner. In accordance with an embodiment of the invention, coma is intentionally introduced to an optical system providing a light beam for an optical code scanner. This provides a scanning beam with plural beam waists at different distances from the scanner. This may be accomplished by orienting the light source and focusing optical system so that their optical axes intersect or by introducing an optical member, such as a prism, between the original light source and the focusing optical system.

20 Claims, 6 Drawing Sheets

METHOD AND APPARATUS FOR SCANNING OPTICAL CODE

The present patent application is the U.S. national stage of International Application No. PCT/US08/086160, which was published in English on Jun. 17, 2010 under Publication No. WO 2010/068199 A1. The disclosure of the International Application is hereby incorporated by reference in its entirety.

BACKGROUND OF THE INVENTION

The present invention relates generally to optical code scanners and, more particularly, concerns a method and apparatus for scanning optical codes which improves the quality of the scanned image and the range of operation of the scanner.

Anyone who has shopped in a modern supermarket is familiar with optical code imaging devices, in this case a bar code scanner, which facilitate rapid checkout by scanning barcodes imprinted on product packages. This is a relatively undemanding application of barcode reading, as a package is essentially brought to a standstill by the operator for purposes of reading the bar code. However, the barcode reader still must have a reasonable range of distances of operation, since the user cannot place a barcode at precisely the same location every time.

More recently, optical code readers have been utilized in production lines where items are assembled, where they are inspected, where they are packaged, and the like. This application of optical code reading is far more demanding, as products move on a production line at a relatively high speed, for example, a conveyor belt. To avoid the creation of a bottleneck on the production line, it is therefore important that accurate decoding of optical codes take place without reducing the speed at which the objects move down the production line. The speed at which an optical code can be decoded accurately therefore becomes a primary concern. Everything else being equal, optical codes can be detected at higher production line speeds and more reliably if the code reader can scan the code over a greater range of distances from the scanner.

One form of optical scanner commonly used with linear barcodes projects a laser beam at a remote optical code and scans the beam linearly along the direction of the barcode. More of the laser beam is reflected from the light areas of the barcode than the dark areas (the bars), so the light reflected from the barcode, when sensed, contains a sequence of bright and dark portions corresponding, respectively, to the spaces and bars of the barcode, respectively.

Accurate detection of the light and dark areas of the barcode requires that a well focused light source be scanned over the barcode, particularly in the presence of substantial ambient light, to make an accurate determination which areas are light or dark and, in particular, where the transition between the light and dark areas occurs. A common approach is to focus the light source to a specific position where the barcode is expected to be and to restrict the beam diameter by passing the beam through an aperture of predefined size. FIG. 1 is a schematic representation of a beam that has been so processed. As may be seen, the beam will have a minimum diameter portion or waist and will increase in width on either side of the waist. Although the quality of scanning is excellent when the optical code is located at the waist, the quality decreases, with an attendant degradation of optical resolution, at distances away from the waist, particularly at positions closer to the scanner. As a result, the scanner has an operating range R, beyond which resolution may be unacceptable or the contrast may be reduced so much as to make the optical code unreadable. The operating range R could be increased by reducing the size of the aperture, but only at the expense of reducing overall illumination. That is, a substantial increase in the brightness of the light source becomes necessary.

Therefore, a substantial need exists in the prior art to improve the operating range of optical code scanners.

SUMMARY OF THE INVENTION

Since the discovery of the optical lens, man has been struggling to improve the quality of optical lenses and systems by eliminating optical aberrations. In accordance with one aspect of the present invention, an optical aberration is introduced intentionally into the optical system which produces the scanning beam of an optical scanner, in order to produce a scanning beam which has plural focal points or waists at different distances from the scanner. The operating range of the scanner can thereby be increased by taking advantage of different beam waist locations when the optical code is at different distances from the scanner. This is achieved without shaping the optics unusually and without performing complex processing on the light.

Comatic aberration or "coma" is a common form of optical aberration that occurs in optical systems with an off-axis source of light. That is, a light source which is not aligned with the optical axis. Specifically, different parts of the optical system, for example different parts of a lens do not focus light passing through them to the same point. As a result, a lens with coma, instead of producing a single beam waist with an off-axis source, produces a plurality of beam waists at different distances from the lens, depending upon the point at which the off-axis light impinges on the lens.

In accordance with one embodiment, coma is intentionally introduced to an optical system providing a light beam for an optical code scanner. This provides a scanning beam with plural beam waists at different distances from the scanner. This may be accomplished by orienting the light source and focusing optical system so that their optical axes intersect or by introducing an optical member, such as a prism, between the light source and the focusing optical system.

BRIEF DESCRIPTION OF THE DRAWINGS

The foregoing brief description and further objects, features, advantages of the present invention will be understood more completely from the following detailed description of presently preferred, but nonetheless illustrative, embodiments in accordance with the present invention, with reference being had to the companying drawings, in which.

DETAILED DESCRIPTION OF THE PREFERRED EMBODIMENTS

Figure 1:
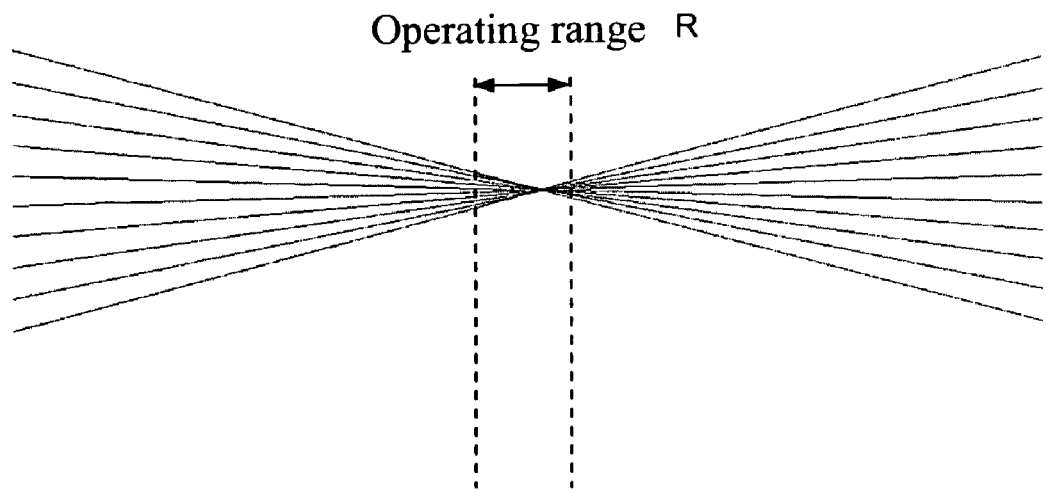
FIG. 1 is a schematic representation of a light beam produced by an existing optical code scanner which focuses the light source, aberration-free, to a specific position and restricts the beam diameter by passing the beam through an aperture of predefined size.
Figure 2:
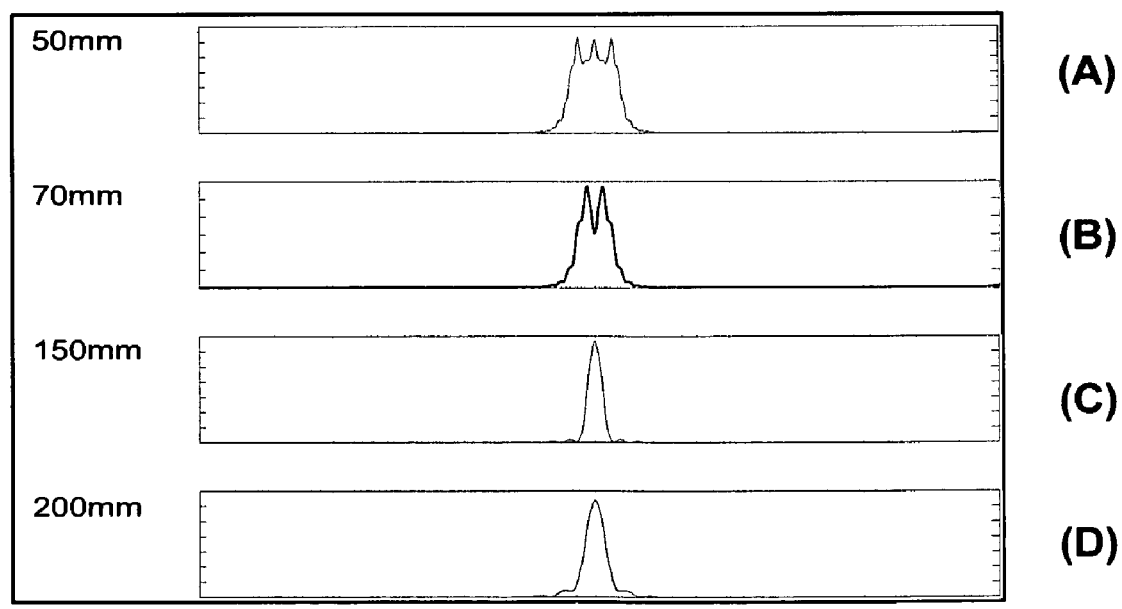
FIG. 2, comprising the waveforms of FIGS. 2(A), 2(B), 2(C) and 2(D), is a beam profile illustrating the shape of a typical aberration-free beam produced by an optical scanner.

FIG. 2, comprising the waveforms of FIGS. 2(A), 2(B), 2(C) and 2(D), is a beam profile illustrating the shape of a typical aberration-free beam produced by an optical scanner. Each waveform represents the amplitude of the light beam as a function of its spatial width. These characteristics were produced in an optical system in which the wavelength of the laser is 650 nm, the divergent angle of illumination is 28° along the x-axis and 8.5° along the y-axis, the aperture diameter is 0.8 mm, the focal length of the collimating lens is 2.33 mm, the nominal focal position of the collimating lens is 150 mm, the coma aberration at the specified aperture is one wavelength, and the barcode interval is the is 5 mil.

The narrowest beam in FIG. 2 is produced at a distance of 150 mm from the scanner (FIG. 2(C)). Although at a distance of 200 mm (FIG. 2(D)), the beam is still quite narrow, it deteriorates rapidly at distances close to the scanner. For example, at 70 mm (FIG. 2(B)) the beam width is comparable to the barcode interval, so that optical resolution degrades to virtually zero. Furthermore, the multiple peaks cause the effective contrast of the barcode image to reverse, leading to improper decoding of the barcode. The situation becomes even worse at 50 mm from the scanner (FIG. 2 (A)). Therefore, an optical scanner with an aberration-free beam is seriously limited in its effective range of operation.

Figure 3:
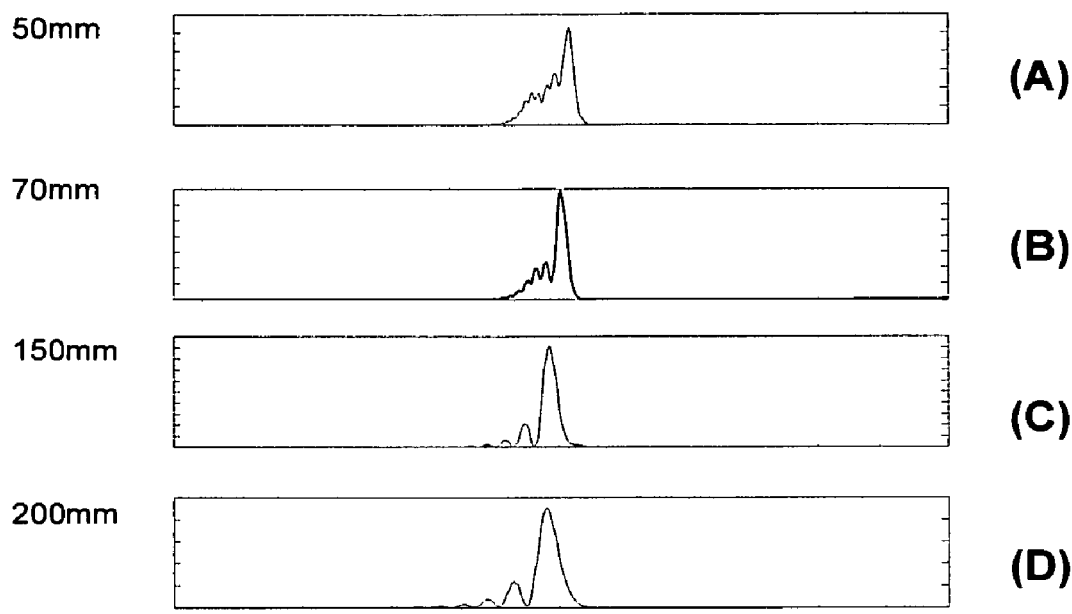
FIG. 3, comprising the waveforms of FIGS. 3(A), 3(B), 3(C) and 3(D), is a beam profile illustrating the shape of a beam produced by an optical scanner in which comatic aberration has been introduced in accordance with one aspect of the present invention.

FIG. 3, comprising the waveforms of FIGS. 3(A), 3(B), 3(C) and 3(D), is a beam profile illustrating the shape of a beam produced by an optical scanner in which coma aberration has been introduced in accordance with one aspect of the present invention. A preferred method of producing the coma aberration is discussed further below. Otherwise, the parameters of the optical system are the same as those defined with respect to FIG. 2. As may be seen, the beam profile remains narrow and exhibits only a single peak over the entire range of optical code distances from 50 mm to 200 mm from the scanner. Therefore, an optical scanner employing intentionally introduced coma aberration avoids the loss of resolution and contrast ambiguity introduced by the aberration-free scanner at close distances.

Figure 4:
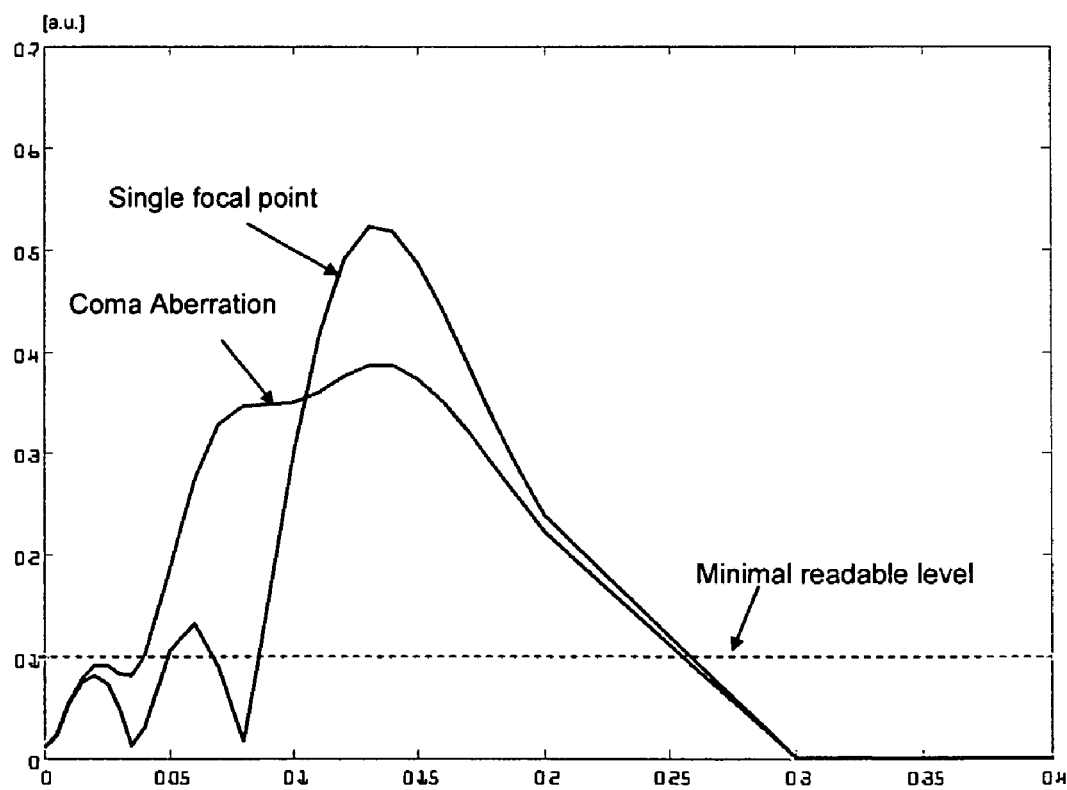
FIG. 4 summarizes the optical performance of the systems represented by FIG. 2 (the aberration-free single focal point system) and FIG. 3 (the system with coma aberration intentionally introduced)

FIG. 4 summarizes the optical performance (normalized contrast level or Modulation Transfer Function (MFT)) of the systems represented by FIG. 2 (the aberration-free, single focal point system) and FIG. 3 (the system with coma aberration intentionally introduced). Separate curves are shown representing optical resolution obtained with respect to each of the systems as a function of distance of the optical code (in meters) from the scanner. Also shown, as a dashed line, is the minimum readable level T, which represents an operational threshold for the scanner. As explained with respect to FIG. 2, the optical resolution begins to fail with a single focal point system at about 70 mm. In comparison, it can be seen that a system with coma aberration operates effectively down to below 50 mm. The system with coma aberration therefore achieves a substantial improvement in operating range.

Figure 5:
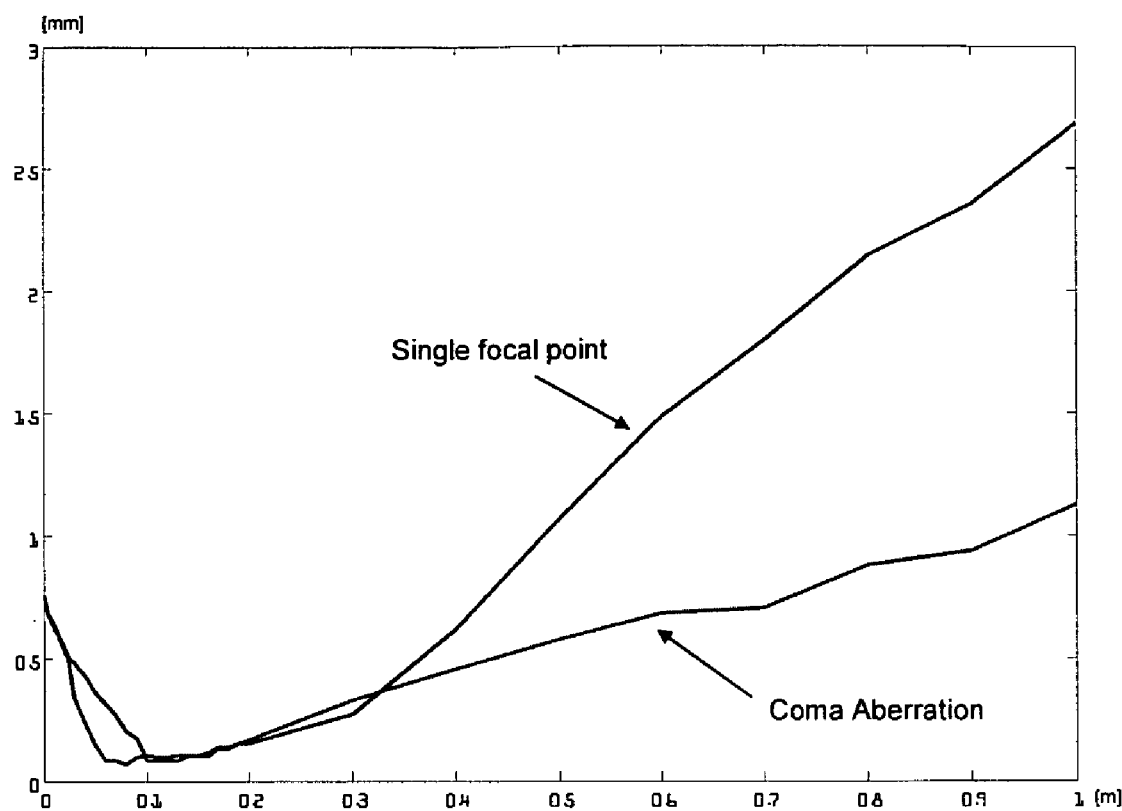
FIG. 5 illustrates the full width half modulation (FWHM) beam width in the propagation direction for the single focal point and coma aberration systems as a function of the distance between the optical code and the scanner.

FIG. 5 illustrates, in separate curves, the full width half modulation (FWHM) beam width in the propagation direction for the single focal point and coma aberration systems as a function of the distance of the optical code from the scanner. As can be seen, the beam width increases much faster with the single focal point system with increasing distance of the optical code from the scanner.

Figure 6:
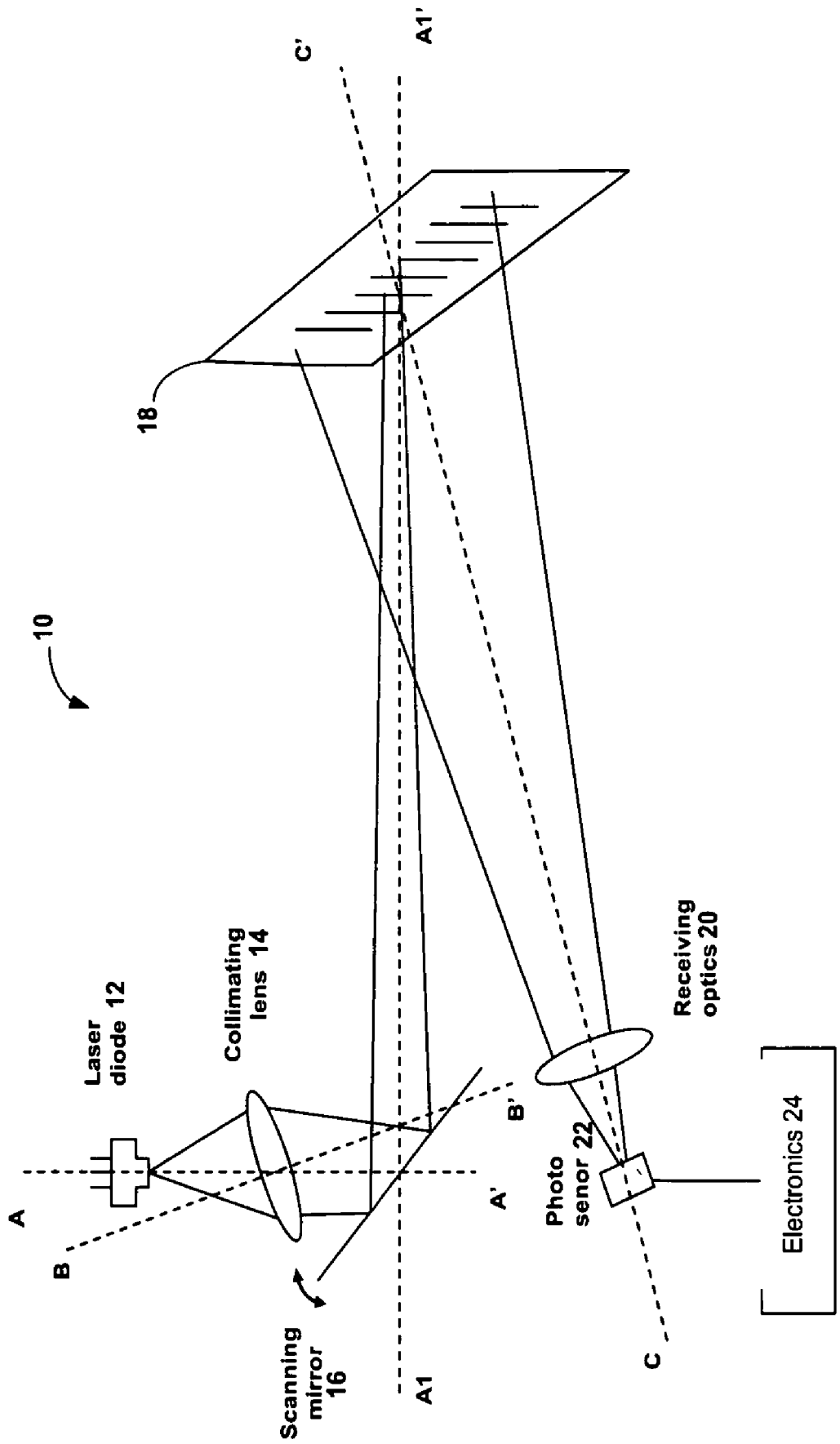
FIG. 6 is a schematic diagram of a first embodiment of an optical code scanner in accordance with the present invention.

FIG. 6 is a schematic diagram of a first embodiment 10 of an optical code scanner in accordance with the present invention. A laser diode 12 having an optical axis A acts as the source of light for the scanner. Light emitted by the diode is directed at a collimating lens 14 having an optical axis B. In a typical prior art scanner, axes A and B are collinear and the diode and lens are positioned so as to produce a focal point at a predefined position, at which the optical code is expected to be located. In accordance with the present embodiment, the same diode and lens are similarly positioned, but lens 14 is rotated counterclockwise so that axes A and B intersect at an acute angle. This angle between axes A and B is selected to be a value that will introduce, in the light emitted from lens 14, sufficient comatic aberration to extend the operating range of the scanner, as explained above. Preferably, the comatic aberration is approximately one wavelength.

The light emitted from lens 14 impinges on scanning mirror 16 and is reflected therefrom towards the remote optical code 18. As indicated by the double-headed arrow mirror 16 is rotated about an axis perpendicular to the plane of the drawing so as to scan the beam of light reflected from mirror 16 along the optical code 18.

Light reflected from optical code 18 enters receiving optics 20 (imaging optics for collecting light) and is focused on a photo sensor 20, which produces an electrical signal representing the received light information. That signal is passed to electronics 24, which processes the signal to recover the information contained in the optical code 18.

Figure 7:
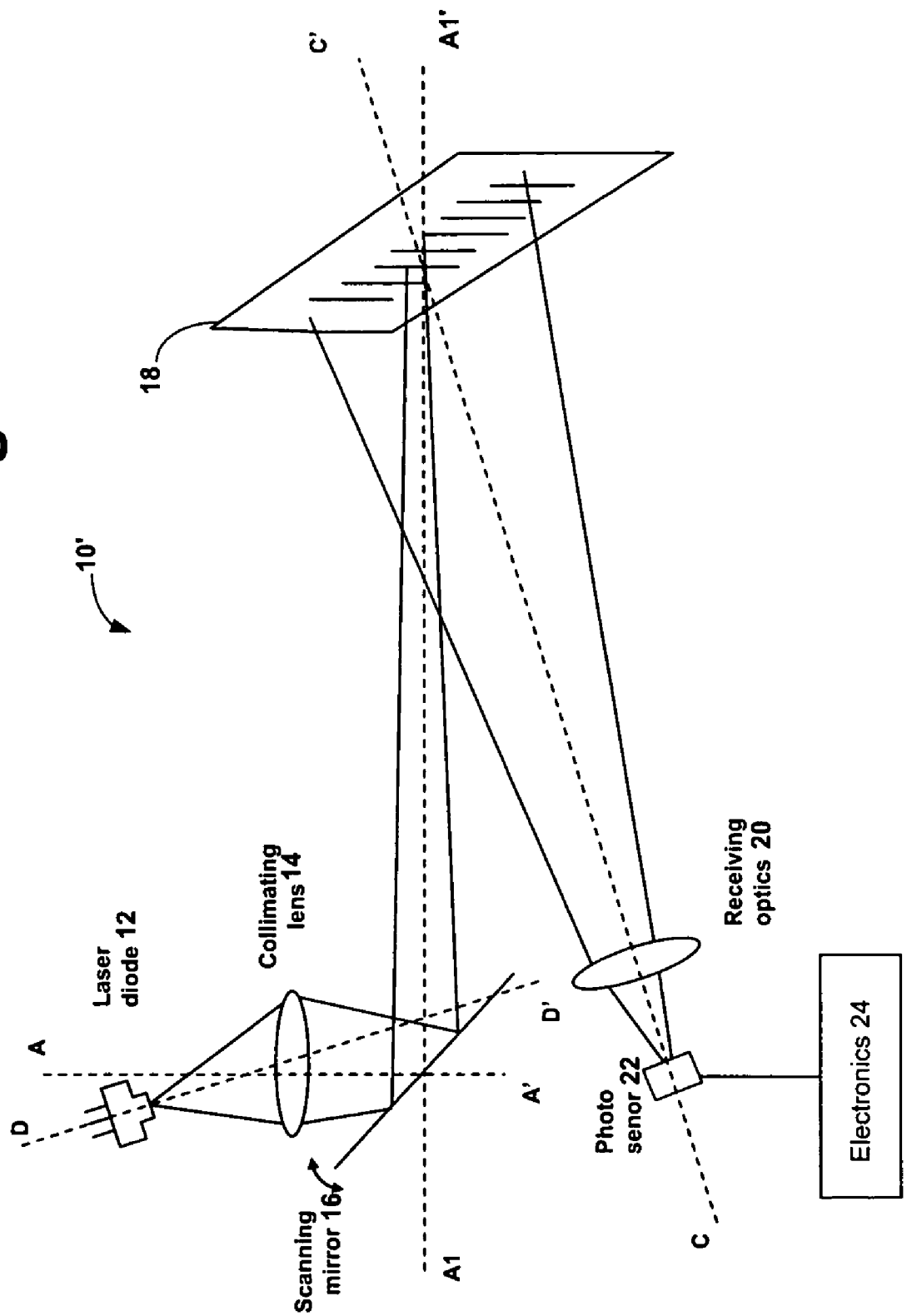
FIG. 7 is a schematic diagram of a second embodiment of an optical code scanner in accordance with the present invention.

FIG. 7 is a schematic diagram of a second embodiment 10' of an optical code scanner in accordance with the present invention. In most respects, embodiment 10' is identical to embodiment 10, and corresponding components have been indicated with the same reference characters. The essential difference lies in the arrangement of diode 12 and lens 14. In a typical prior art scanner, axes A and B are collinear and the diode and lens are positioned so as to produce a focal point at a predefined position, at which the optical code is expected to be located. In this embodiment, the same diode and lens are similarly positioned, but diode 12 is rotated counterclockwise so that axes A and B intersect at an acute angle. This angle between axes A and B is selected to be a value that will introduce, in the light emitted from lens 14, sufficient comatic aberration to extend the operating range of the scanner, as explained above. Preferably, the comatic aberration is approximately one wavelength.

It should be noted that embodiments 10 and 10' use the same light source and lens as a conventional optical scanner, but simply reorient the light source or scanner. The advantages of the present invention could therefore be achieved with existing scanners with very little physical modification. Moreover, the improvements obtained with comatic aberration are achieved with a simple lens (no special shape) and without complex processing of the light.

Figure 8:
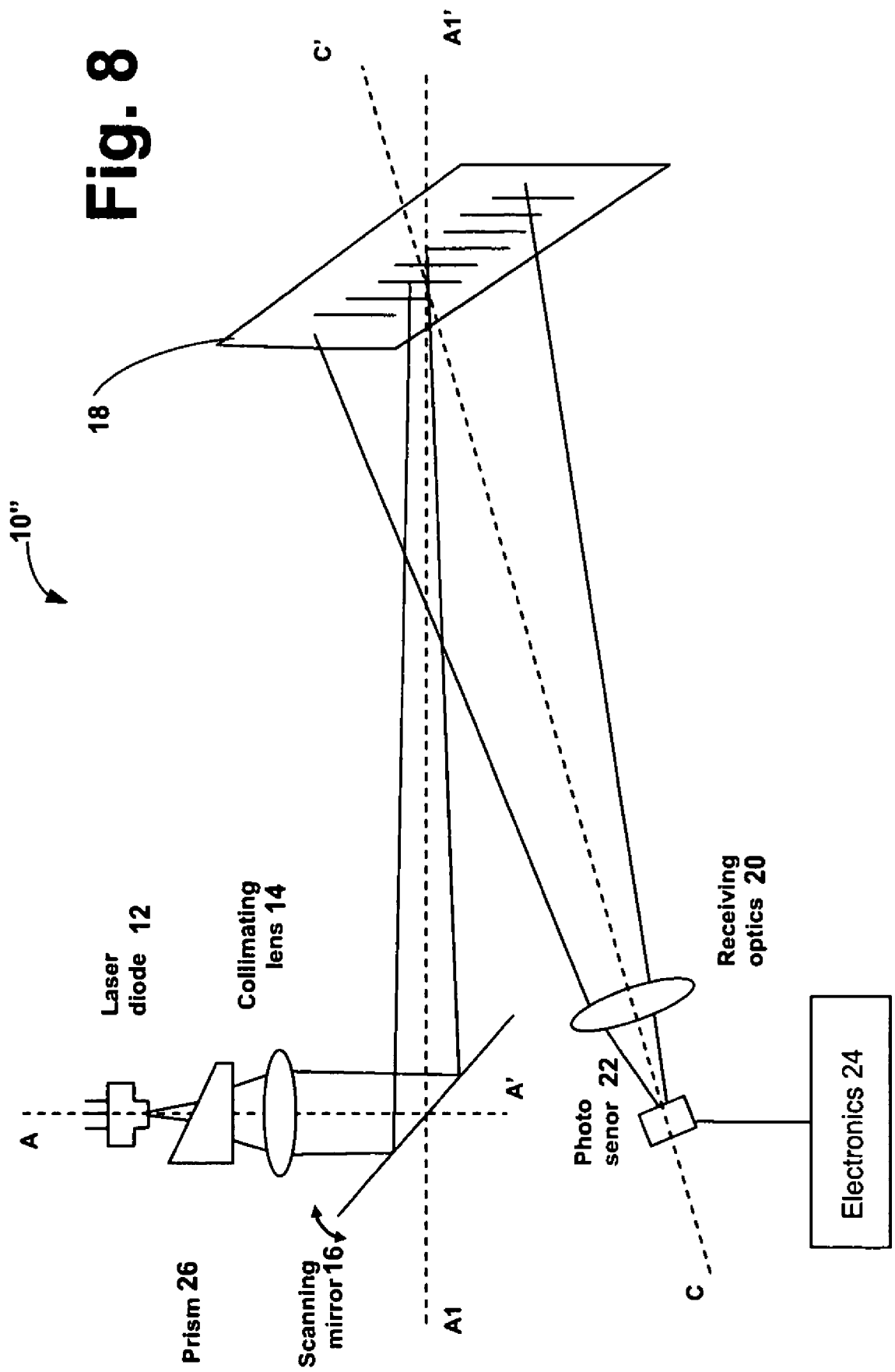
FIG. 8 is a schematic diagram of a third embodiment of an optical code scanner in accordance with the present invention.

FIG. 8 is a schematic diagram of a third embodiment 10" of an optical code scanner in accordance with the present invention. In most respects, embodiment 10" is identical to embodiment 10, and corresponding components have been indicated with the same reference characters. The essential difference lies in the interposition of a prism 26 between diode 12 and lens 14. In a typical prior art scanner, axes A and B are collinear and the diode and lens are positioned so as to produce a focal point at a predefined position, at which the optical code is expected to be located. In this embodiment, the same diode and lens are similarly positioned, but prism 26 produces in the light emitted from lens 14 sufficient comatic aberration to extend the operating range of the scanner, as explained above. Preferably, the comatic aberration is approximately one wavelength.

Figure 9:
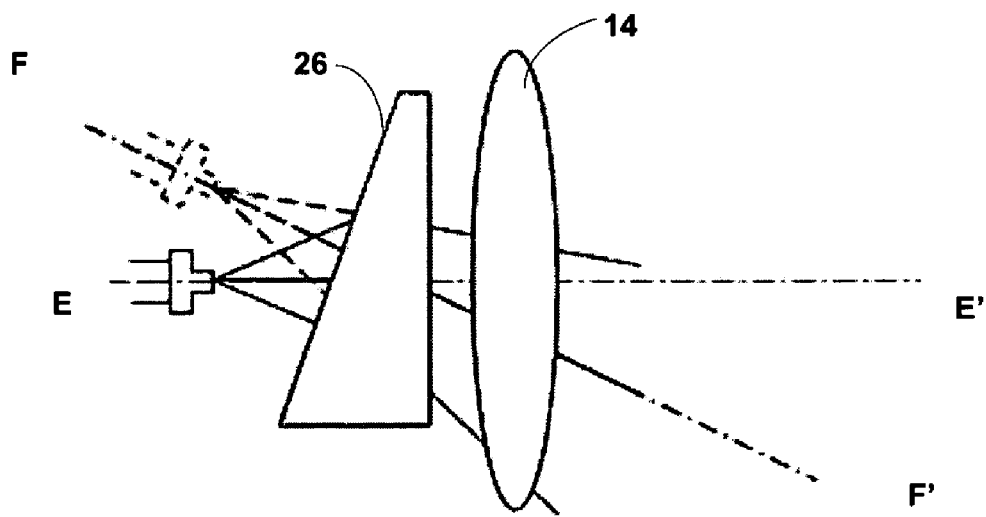
FIG. 9 illustrates schematically how the prism if FIG. 8 causes the lens to exhibit comatic aberration.

FIG. 9 illustrates schematically how prism 26 causes lens 14 to exhibit comatic aberration. In the absence of the prism, light from the diode at position E would emerge from lens 14 at E'. However, prism 26 refracts the light from the diode to cause it to emerge at F'. In effect, prism 26 makes the diode appear (a virtual image) as if it were present at F in the indicated orientation. However, as explained with respect to FIG. 6, such a configuration introduces comatic aberration into the lens.

It should be noted that embodiments 10" uses the same light source and lens as a conventional optical scanner and could retain essentially their original orientations by appropriate design of the prism. The advantages of the present invention could therefore be achieved by retrofitting existing scanners with virtually no physical modification. Moreover, the improvements obtained with comatic aberration are achieved with a simple lens (no special shape) and without complex processing of the light.

Although preferred embodiments of the invention have been disclosed for illustrative purposes, those skilled in the art will appreciate that many additions, modifications and substitutions are possible without departing from the scope and spirit of the invention as defined by the accompanying claims.

What is claimed is:

1. A method for increasing the range over which an optical code can be read by an optical scanner including a light source and optics for focusing the light source, the method comprising the step of:
arranging the light source and the optics relative to one another in a first position or orientation to intentionally introduce an optical aberration; and
directing light at the optics by the light source while in the first position or orientation, wherein the light exiting the optics has plural focal points as a result of the optical aberration, which enables the optical scanner to read the optical code in a plurality of ranges.

2. The method of claim 1 wherein the optical aberration is a comatic aberration.

3. The method of claim 2 wherein the light source and the optics have optical axes, and wherein the optical axes of the light source and the optics intersect in the first position or orientation to intentionally introduce the optical aberration.

4. The method of claim 2 wherein the light source and optics have optical axes that are collinear in the first position or orientation, and wherein an optical component is interposed between the light source and the optics to intentionally introduce the comatic aberration.

5. The method of claim 4 wherein the optical component is a prism.

6. The method of claim 1 wherein the optical aberration is approximately one wave length.

7. The method of claim 1 wherein the light source and the optics have optical axes, and wherein the first position or orientation comprises rotating a lens of the optics so that its axis intersects the axis of the light source at an acute angle.

8. The method of claim 1 wherein the light directed at the optics by the light source is a laser beam, and wherein the laser beam has a beam profile that is narrow and exhibits only a single peak over the plurality of ranges.

9. A method for constructing an optical scanner having an extended range over which an optical code can be read, comprising the steps of:
providing a light source having a first optical axis and optics having a second optical axis, the light source and optics being constructed so that light directed from the light source through the optics will have a focal point at a predefined distance from the optic when the light source and optics are arranged with a predefined spacing and their optical axes collinear; and
arranging the light source and optics to be substantially at the predefined distance, but orienting them so that their optical axes intersect;
whereby light originating from the light source and exiting from the optics exhibits plural focal points and produces an illumination for an optical code which permits the code to be read over a range which is greater than the range over which the code could be read if the light source and optics were arranged with their optical axes collinear.

10. A method for constructing an optical scanner having an extended range over which an optical code can be read, comprising the steps of:
providing a light source having a first optical axis and optics having a second optical axis, the light source and optics being constructed so that light directed from the light source through the optics will have a focal point at a predefined distance from the optic when the light source and optics are arranged with a predefined spacing and their optical axes collinear;
arranging the light source and optics with their optical axes collinear; and
interposing between the light source and the optics an optical component which causes light originating from the source and exiting from the optics to exhibit coma;
whereby light originating from the light source and exiting from the optics exhibits plural focal points and produces illumination for an optical code which permits the code to be read over a range which is greater than the range over which the code could be read in the absence of the optical component.

11. The method of claim 10 wherein the optical component is a prism.

12. In an optical code scanner, an illumination source for light to be scanned across a remote optical code in order to read the same, comprising:
a light source having a first optical axis and optics having a second optical axis, the light source and optics being constructed so that light directed from the light source through the optics will have a focal point at a predefined distance from the optic when the light source and optics are arranged with a predefined spacing and their optical axes collinear; and
means mounting the light source and optics to be substantially at the predefined distance, but orienting them so that their optical axes intersect;
whereby light originating from the light source and exiting from the optics exhibits plural focal points and produces an illumination for an optical code which permits the code to be read over a range which is greater than the range over which the code could be read if the light source and optics were arranged with their optical axes collinear.

13. In combination with the illumination source of claim 12, a scanning mirror positioned to receive light emitted from the optics and to reflect the same towards a remote optical code, said mirror being further constructed to be moveable so as to sweep light reflected therefrom along the optical code.

14. The combination of claim 13 further comprising decoding means positioned to receive light reflected from the optical and including a photo sensor for the light having an electrical output and electronics responsive to the electrical output and constructed to process the same so as to recover information in the optical code.

15. In an optical code scanner, an illumination source for light to be scanned across a remote optical code in order to read the same, comprising:
 a light source having a first optical axis and optics having a second optical axis, the light source and optics being constructed so that light directed from the light source through the optics will have a focal point at a predefined distance from the optic when the light source and optics are arranged with a predefined spacing and their optical axes collinear; and
 means mounting the light source and optics so that their optical axes are collinear; and
 an optical component interposed between the light source and the optics, sad component constructed to cause light originating from the source and exiting from the optics to exhibit coma;
 whereby light originating from the light source and exiting from the optics exhibits plural focal points and produces an illumination for an optical code which permits the code to be read over a range which is greater than the range over which the code could be read in the absence of the optical component.

16. In combination with the illumination source of claim 15, a scanning mirror positioned to receive light emitted from the optics and to reflect the same towards a remote optical code, said mirror being further constructed to be moveable so as to sweep light reflected therefrom along the optical code.

17. The combination of claim 16 further comprising decoding means positioned to receive light reflected from the optical and including a photo sensor for the light having an electrical output and electronics responsive to the electrical output and constructed to process the same so as to recover information in the optical code.

18. The illumination source of claim 15 wherein the optical component is a prism.

19. In combination with the illumination source of claim 18, a scanning mirror positioned to receive light emitted from the optics and to reflect the same towards a remote optical code, said mirror being further constructed to be moveable so as to sweep light reflected therefrom along the optical code.

20. The combination of claim 19 further comprising decoding means positioned to receive light reflected from the optical and including a photo sensor for the light having an electrical output and electronics responsive to the electrical output and constructed to process the same so as to recover information in the optical code.

* * * * *

UNITED STATES PATENT AND TRADEMARK OFFICE
CERTIFICATE OF CORRECTION

PATENT NO. : 8,393,543 B2  Page 1 of 1
APPLICATION NO. : 12/998871
DATED : March 12, 2013
INVENTOR(S) : Duan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 12 days.

Signed and Sealed this
First Day of September, 2015

Michelle K. Lee
*Director of the United States Patent and Trademark Office*